United States Patent [19]
Brezoczky et al.

[11] Patent Number: 5,351,229
[45] Date of Patent: Sep. 27, 1994

[54] TRIBO-ATTRACTIVE CONTACT SLIDER FOR AN OPTICAL READ/WRITE SYSTEM

[75] Inventors: Blasius Brezoczky, San Jose; Gary M. McClelland, Palo Alto; Hajime Seki, San Jose, all of Calif.

[73] Assignee: International Business Machines Corporation, Armonk, N.Y.

[21] Appl. No.: 814,722

[22] Filed: Dec. 24, 1991

[51] Int. Cl.$^5$ ............................................... G11B 13/04
[52] U.S. Cl. .................................... 369/99; 369/113; 360/114
[58] Field of Search .................... 360/102, 114, 59; 369/13, 44.19, 44.18, 44.17, 44.15, 99, 113, 114

[56] References Cited

U.S. PATENT DOCUMENTS

| | | | |
|---|---|---|---|
| 4,819,091 | 4/1989 | Brezoczky et al. | 360/97.01 |
| 5,124,961 | 6/1992 | Yamaguchi et al. | 360/114 |

OTHER PUBLICATIONS

J. F. Archard, "Contact and Rubbing of Flat Surfaces," J. Appl. Physics, Jan. 8, 1953, pp. 981–988.
Brezoczky et al., "Triboattraction: Friction under Negative Load," Langmuir, 1990, pp. 1141–1145.

*Primary Examiner*—Constantine Hannaher
*Assistant Examiner*—Don Wong
*Attorney, Agent, or Firm*—Leslie G. Murray

[57] ABSTRACT

An optical recording system in which the optical head is operated in physical contact with the surface of the optical recording medium during system operation at a selected operating speed. The optical head includes one or more optical elements mounted on a substrate which is in physical, sliding contact with the recording medium. The substrate is fabricated from a crystalline material which has a non-linear load versus friction characteristic in the negative load region. When the head is in sliding contact with the recording medium surface, a restoring force is generated which maintains the optical head in physical contact with the recording medium overcoming any lifting forces generated by the moving air layer adjacent the recording medium surface. This allows the head to be operated with a negative external load applied. Utilizing the optical head having the objective lens mounted on the substrate in close proximity to the recording medium surface allows high density recording to be achieved without the requirement of an electro-mechanical servo system to provide beam focusing for the system.

30 Claims, 4 Drawing Sheets

TRIBO-ATTRACTIVE CONTACT SLIDER FOR AN OPTICAL READ/WRITE SYSTEM

BACKGROUND OF THE INVENTION

The present invention relates generally to optical disk storage systems and, more particularly, to an optical disk storage system in which the optical transducer is mounted in a slider in contact with the storage medium at an operating speed which utilizes the tribo-attractive effect to minimize wear.

In magnetic storage systems, an information bit is stored by focusing a magnetic field to a small volume on the disk to align the magnetic domains in that volume to a desired orientation. In optical storage systems, an information bit is stored by focusing a laser beam onto a small spot on the optical disk to heat the medium and thus effect a physical change in the medium material at that spot. In the case of magneto-optic storage systems, the heat generated by the laser beam causes the magnetic domains at the spot location to be aligned with an applied magnetic field. In all moving disk storage systems, the demand for increased storage capacity is presently being met by increasing the areal bit density on the storage disk.

In magnetic disk storage systems, increase of areal bit density requires the reduction of three basic parameters, the magnetic write transducer (head) gap length, the thickness of the magnetic storage media and tile head to disk separation. Given a specified gap length and media thickness, the smaller the head-disk separation, i.e., tile lower the head flying height, is, the smaller the bit cell size which can be achieved is. The limit of lower flying height is contact recording, in which the slider is in physical contact with the rotating magnetic disk, i.e., the slider is sliding or rubbing continuously on the disk surface and the read/write transducer is as close as the edge of the slider can be to the disk surface. U.S. Pat. No. 4,819,091 to Brezoczky et al, assigned to the instant assignee, discloses a magnetic contact recording system comprising a magnetic read/write head mounted on a slider which is in physical contact with the rotating storage medium. A tribo-attractive force is generated between the moving disk surface and the slider which counteracts the lifting force generated by the moving air layer adjacent the disk surface and which allows contact recording and reading of data without excessive wear to either the magnetic head and slider or the recording medium.

In an optical storage system, a laser beam is projected onto the optical storage medium (optical disk) and focused to a small spot on the disk surface through an optical transducer or head. In prior art optical systems, the optical head is maintained well above the medium surface and the beam spot size is defined by the laser light wavelength ($\lambda$) and conventional optics. It has been generally believed that the diffraction limit in air of about $\lambda/1.5$ is the fundamental lower bound in resolution for any optical image recording. Thus, the primary means of increasing areal bit density in an optical or magneto-optical system has traditionally been to utilize laser beams of shorter wavelength. The beam output of injection lasers presently in use have wavelengths on the order of 1 micrometer ($\mu m$). New lasers, use of second or higher order harmonics and frequency multipliers are currently being explored. However, considerable difficulty is being encountered and the likelihood of development of new lasers having suitable characteristics in the near future is low. On the other hand, there has been steady improvement in the reliability and power capabilities of the currently used conventional semiconductor lasers which is likely to continue due to their wide use.

To achieve high density optical recording at or near the diffraction limit utilizing conventional semiconductor lasers it is necessary to very tightly focus the laser beam. This requires high numerical aperture objective lens which means that the lens must be maintained very precisely at the focal distance from the optical medium. Typically, focus is accomplished by an electro-mechanical servo system which maintains the optical head at the required distance from the medium thus adding to the mass and size of the optical head. Alternatively, in systems which do not physically adjust the distance of the head from the medium, relatively complex focusing systems elsewhere in the system are required to compensate for the varying head height.

SUMMARY OF THE INVENTION

It is the principal objective of the present invention to provide a high density, contact recording system for a moving optical or magneto-optical storage system in which a tribo-attractive force is generated to maintain the optical recording head in contact with the moving recording medium without excessive wear of either the optical head or the recording medium.

In accordance with the principles of the present invention, an optical storage system is provided in which the objective lens and other optical components of an optical head are mounted on a slider suspended from a support arm such that the slider is maintained in physical contact with the moving optical storage medium (optical disk). Relative motion between the optical slider and the optical disk generates a tribo-attractive force which maintains a very steady average slider-disk separation, fluctuating within only several nanometers (nm) with respect to the disk surface. Since the slider is in contact with the disk surface, the focal length of the objective lairs is dictated only by the thickness of the transparent protective layers over the recording layer, i.e., the optical medium, of the optical disk, thus greatly reducing the focal length for the objective lens.

A typical prior art optical disk storage system comprises a fixed optical element and a movable optical element generally referred to as the optical head. The optical head includes such components as an objective lens, one or more mirrors, a focus actuator motor and a fine tracking actuator. The optical head is mounted in a carriage which rides on a pair of rails for radial motion across the disk. Typically, the carriage will provide mountings for coarse tracking actuator coils and also include a set of wheels which engage the rails. The mass and size of the optical head and carriage combination are principal contributors to the relatively long access times encountered in optical disk drive systems. In the present invention, the objective lens is fixedly mounted on the slider and is maintained at an essentially constant separation from the optical media with the same degree of accuracy with which the slider itself is maintained from the disk surface. Thus the requirement for a focusing servo system is eliminated. This allows the movable objective lens holder, focus actuator motor, focus servo controller and associated circuitry and other components to be eliminated from the system, resulting in a smaller, less massive optical head and a less complex system with fewer components. The end result is a much smaller, lighter optical slider having few optical components suspended from a linear or radial access arm. Both coarse and fine tracking actuator functions may be combined in a single access arm actuator, such as a voice coil motor, with all controller functions implemented in a single actuator controller. Thus, the present invention provides an optical disk drive system from which the focus servo system has been eliminated and which achieves data access times comparable to access times available with present day magnetic disk storage systems.

Reduction of the objective lens focal distance allows lenses having higher numerical aperture to be used, thus providing much tighter focus of the laser beam and achieving increased areal bit density. Additionally, the elimination of the servo-mechanical systems for focusing greatly simplifies the system and reduces both the mass and size of the optical head. The smaller, less massive head reduces access time and makes feasible the stacking of optical disks to provide increased volume density.

An additional increase in areal bit density may be realized by utilizing the well-known principle that the wavelength of light in a medium is reduced by its index of refraction in that medium. In one embodiment of the present invention, the optical head comprises a plano convex objective lens mounted on a slider such that its flat surface is essentially co-planar with the bearing or bottom surface of the slider. The very small separation, a small fraction of the laser wavelength, between the flat bottom surface of tile focusing optics and the optical disk overcoat layer, i.e., the recording layer protective layer, allows relatively efficient transmission of the laser beam power. If materials having a high refractive index are used for the disk overcoat and tile focusing optics, tile laser beam wavelength will be reduced, thus improving tile optical resolution and providing increased areal bit density.

BRIEF DESCRIPTION OF THE DRAWINGS

The foregoing and other objects, features and advantages of tile present invention will be apparent from the following detailed description of a preferred embodiment of the invention, reference being made to the accompanying drawings, in which.

DETAILED DESCRIPTION OF THE PREFERRED EMBODIMENTS

Figure 1:
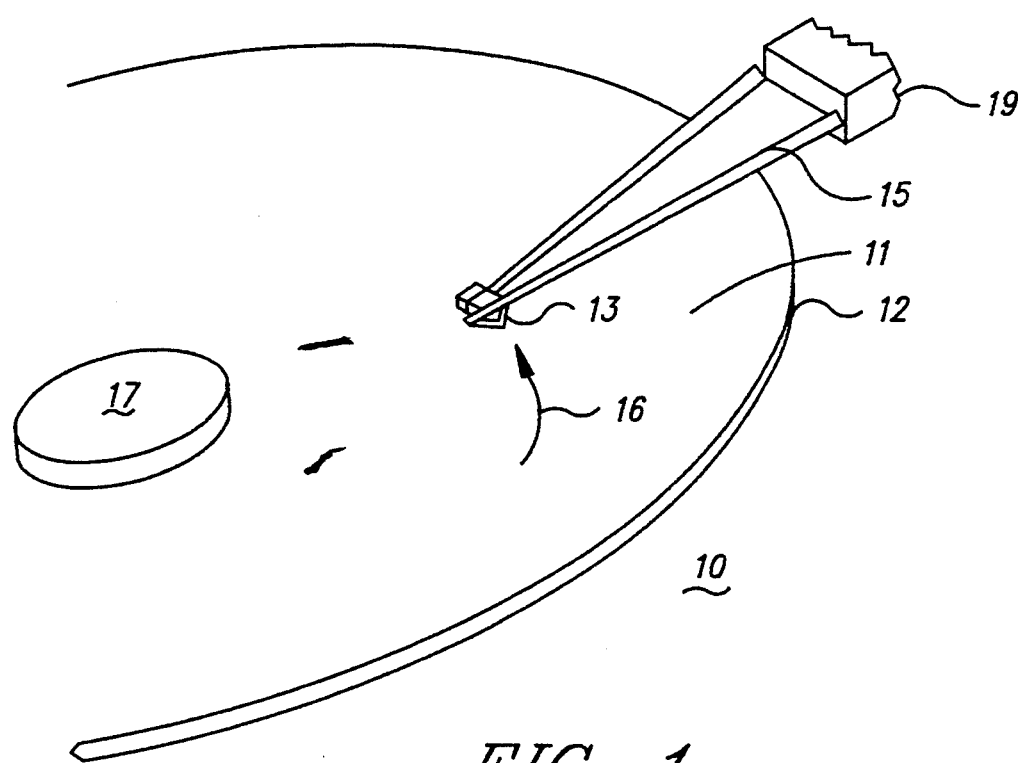
FIG. 1 is a perspective view of a contact slider supported on a rotating storage disk in accordance with the principles of tile present invention.

Referring now to FIG. 1, an information storage system comprising at least one rigid storage disk 12 fixedly supported on a spindle 17 and rotated by a disk drive motor (not shown). The recording medium 11 is deposited oil the disk in a well-known manner in the form of an annular pattern of concentric data tracks, for example. The storage medium is covered by a protective layer such as a carbon or zirconia overcoat. At least one slider 13 is positioned in contact with the protective overcoat layer at the disk surface and supports one or more read/write heads. The slider 13 is attached to an actuator arm 19 by means of a suspension 15. The actuator arm 19 is attached to an accessing mechanism such as a voice coil motor (not shown) for positioning the read/write heads over desired data tracks. As the storage disk 12 rotates, the slider 13 is moved radially across the disk so that the read/write head may access different portions of the disk surface 11.

In accordance with the present invention, the slider 13 is positioned by the suspension arm 15 so that it is in contact with the recording medium at normal operating speed produced by relative motion between the slider 13 and the disk surface 11 in the direction indicated by arrow 16. It is a feature of the present invention that the slider 13 remains in direct physical contact with the disk surface 11 even when the relative motion between the slider and disk surface exceeds speeds of 20 meters per second. Physical contact is maintained by an attractive force, referred to as a tribo-attractive force, that is of sufficient strength to overcome the lifting force created by the film of air which is moving with the disk surface which tends to force the slider away from the disk surface. The above cited U.S. Pat. No. 4,819,091 discloses in detail a magnetic disk storage system incorporating a slider in physical contact with the storage medium and is hereby incorporated by reference as if fully set forth herein.

Figure 2:
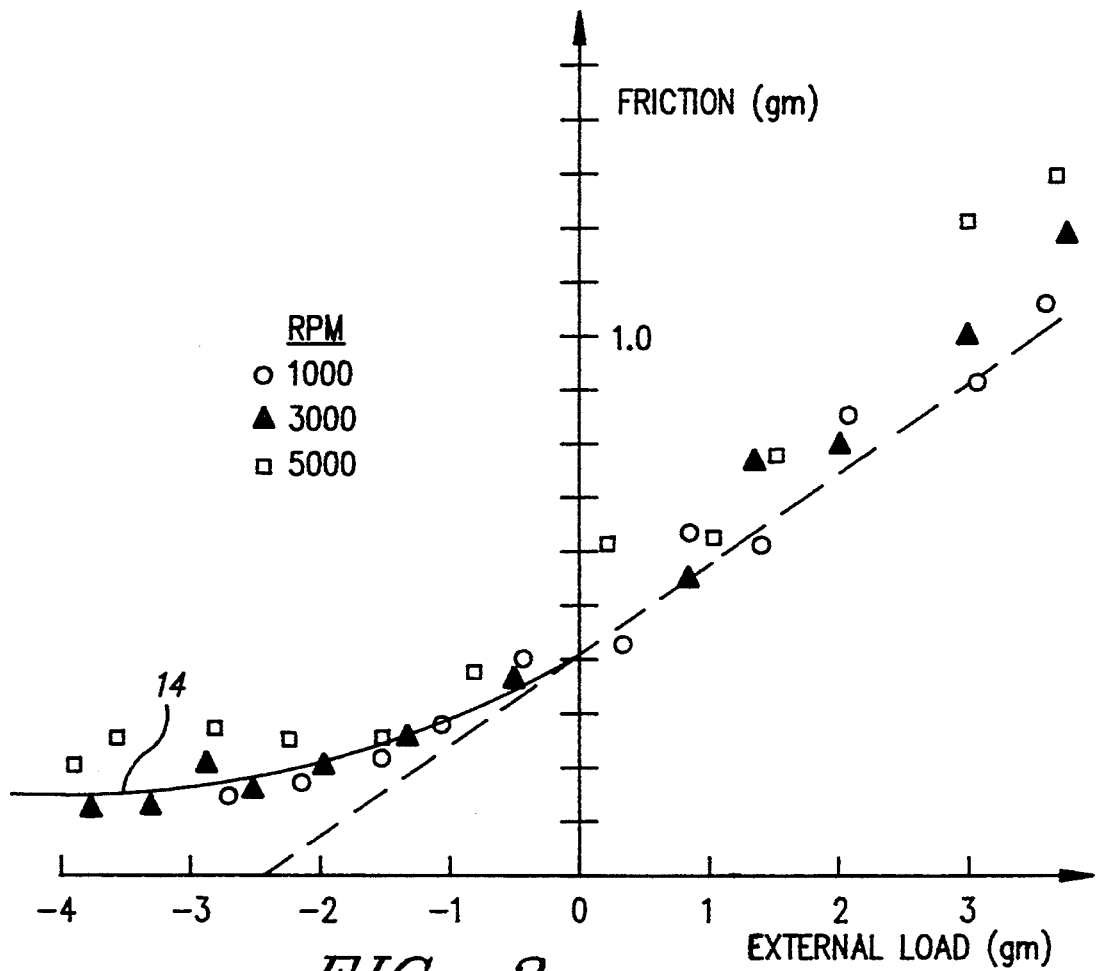
FIG. 2 is a graphical diagram illustrating the frictional force versus external load on a selected slider as shown in FIG. 1.

The tribo-attractive force is due to the coulombic attraction between the tribo-electric charge generated as a result of relative motion between the slider and disk surfaces when in physical contact. The tribo-attractive force is relatively independent of the disk speed above some threshold speed of the order of one meter per second but decreases below this speed. As the speed is reduced, there is a point at which the tribo-attractive force is no longer sufficient to maintain the slider in contact with the disk surface. This point of release appears to be a function of the disk run out and surface roughness. Additionally, as the suspension arm loading, (i.e., the external load, on the slider 13 is decreased to a negative load, a "restoring force" is generated. That is, when the two surfaces are forced apart, the tribo-attractive force increases to counteract the force urging the two surfaces apart. This restoring force enables the slider 13 to be maintained in steady contact with the disk surface 11 in spite of the surface roughness and run out of the disk 12. As shown in FIG. 2, when the external load is positive, the actual load on the slider, i.e., the measured friction between the slider and disk surfaces, is linearly proportional to tile external load on the slider 13 and there is an additional, constant tribo-attractive force. The net load at the slider-disk interface is the sum of these two forces. As the external load is reduced into the negative region, i.e., the slider is pulled up, away from the disk surface, the net load decreases, being tile difference between the tribo-attractive force and the pull on tile slider. As illustrated by curve 14 of FIG. 2, as the external load is decreased into the negative region, the friction versus load characteristic gradually deviates from the linear relationship observed at higher loads in the positive load region. As the magnitude of the negative external load on the slider 13 is: increased, the net load at the slider disk interface decreases slowly as does the frictional force. The tribo-attractive force is a week function of the disk speed above a minimum threshold speed. The restoring force effect and the small net load results in the slider stability and extremely low wear at the slider-disk interface observed in contact recording systems exploiting the tribo-attractive phenomenon. A tribo-attractive contact recording system is described in greater detail in the co-pending U.S. patent application Ser. No. 07/814,124, now U.S. Pat. No. 5,305,165 entitled "Tribo-Attractive Contact Data Storage System" filed on Dec. 24, 1991 date which is hereby incorporated by reference as if fully set forth herein.

The tribo-attractive force generated by the relative motion between the slider and disk contact surfaces includes a restoring force which, in a similar manner to the restoring force of a spring, counters any force tending to separate the slider from the disk surface with an increasing tribo-attractive force. When any perturbing force is applied which tends to separate the slider from the disk, the restoring force thus generated maintains the slider in physical contact with the disk surface. Without the effect of the restoring force, disk surface roughness and disk runout would cause the slider to be separated sufficiently to allow the moving air layer adjacent the disk surface to completely lift the slider from the disk. The net result is that the requirement to apply a large positive force to the slider to counteract the air bearing lift and any perturbing forces is eliminated. Additionally, since the tribo-attractive restoring force generated is only sufficient to counter the perturbing force, no additional load is experienced at the slider/disk contact interface. Thus, the system may be operated with little or no external load on the slider. Optimum system performance is achieved at essentially zero or slightly negative external loading on the slider while the magnetic disk is rotating.

In addition to the material physical characteristics, the extremely low external load on the slider is an important factor in minimizing wear of both the slider and disk contact surfaces and in reducing the effects of stiction. The geometry and surface finish of the slider also play an important role in minimizing wear. While the generated tribo-attractive force is sufficient to counter the lift created by the air bearing, it is also important to minimize the air bearing effect itself as much as practical. However, since the air bearing does provide a beneficial lubricating effect, complete elimination of the air bearing is not desirable.

Whether or not a tribo-attractive force will be generated and the magnitude of the force generated is a function of the materials utilized in the fabrication of the slider and the disk to be used. In view of the present understanding of the tribo-electric charging phenomenon, it is difficult to predict material pairs which will exhibit tribo-attractive contact sliding behavior with the restoring force effect. As a general rule, when the friction versus load curve for a pair of materials, slider and disk, has a characteristic shape, particularly in the negative load region, similar to that of curve 14 illustrated in FIG. 2, the materials are showing tribo-attractive contact sliding behavior. The deviation from the linear relationship in the negative load region which results in an extended gradual monotonical decrease in the friction for negative loads is indicative of the development of a strong restoring force. It has been found that slider materials selected from a wide range of crystalline and amorphous materials having a low coefficient of friction and which are either electrically non-conductive or have a high resistivity in combination with presently available magnetic storage disks exhibit the desirable tribo-attractive characteristics. While materials also exhibiting a high thermal conductivity are preferred, a high thermal conductivity does not appear to be required in all materials which exhibit the tribo-attractive effect. Table I is a listing of various slider materials which exhibit tribo-attractive contact sliding effects when used with a variety of magnetic disks, for example, carbon, zirconia or $Si_3N_4$ overcoated thin film disks, plain and carbon overcoated particulate disks and thin film disks with chromium oxide overcoat.

TABLE I

| Material | Morphology* | TA Behavior |
| --- | --- | --- |
| diamond | sc | excellent |
| sapphire | sc | excellent |
| silicon | sc | possible |
| quartz | sc | good |
| cBN | sc | good |
| $CaTiO_3$ | sc | good |
| SiC | HP | some wear |
| ZrO | HP | some wear |
| alumina | HP | some wear |
| SIALON | HP | good |
| cBN | pc | good |
| fused quartz | a | good |

Note:
*sc = single crystal, pc = polycrystal, a = amorphous, HP = hot pressed compaction (usually multiphase pc mixture)

As shown in Table I, a wide range of materials are potentially useful in tribo-attractive contact recording applications. While a bleed-off path for the tribo-electric charge must be provided, the resistivity of the disk coating is not critical. However, as a general requirement, most of the generated tribo-electric charge should be dissipated to ground in the time required for a single disk revolution. While disk lubricants will decrease friction an enhance the wearability of both the disk and the slider, lubricants and other contaminants which may be absorbed will affect both the tribo-electric and the tribological performance. In practice, the presence of polyether type lubricants have not shown any deleterious effects on the tribo-attractive phenomenon.

Figure 3:
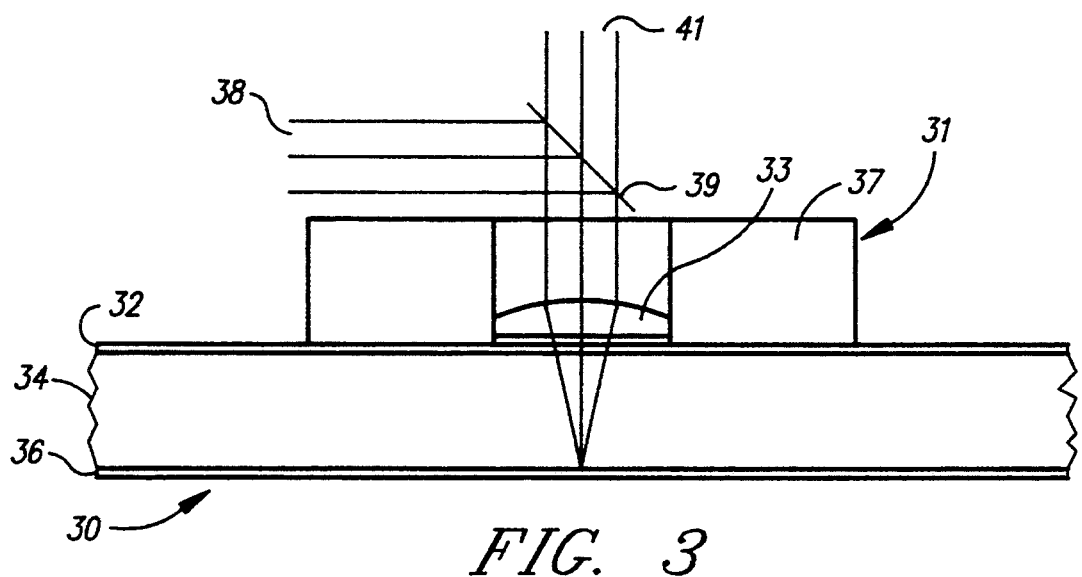
FIG. 3 is a cross-sectional view of one preferred embodiment of the slider shown in FIG. 1.

Referring now to FIG. 3, an optical slider 31 comprising an objective lens mounted on a crystalline slider in physical contact with the surface of an optical disk is shown. Suitable slider materials exhibiting the described tribo-attractive characteristics may generally be selected from a range of crystalline and amorphous materials having a low coefficient of friction and which are electrically non-conductive. While materials also exhibiting a high thermal conductivity are preferred, a high thermal conductivity does not appear to be required in all materials which exhibit the tribo-attractive effect. For example, the optical slider may comprise a simple plano-convex objective lens 33 mounted on a single crystal sapphire slider or other material selected from those shown in Table I.

The optical disk may have the conventional structure of a transparent substrate layer 34 and a thin film optical media 36 on the inner surface of the transparent layer. The outside or upper surface of the transparent substrate layer 34 is coated with a hard, transparent and conducting protective overlayer 32 such as an amorphous carbon film or a zirconium oxide (ZrO₂) presently commercially available thin film disks are obtainable having protective coatings of hard amorphous carbon of approximately 300Å thick. Additionally, the surface of the disks are textured with a roughness of approximately 400Å. Thus, any focusing optics may be positioned within less than 800Å (including the overcoat 32 thickness) of optical disk surface, a small fraction of the wavelength of currently utilized semiconductor lasers, and maintain this position without the requirement of prior art electro mechanical servo mechanisms. With smooth disk and slider surfaces and decreased overcoat layer thickness, head-disk separation of 200Å or less may be achieved.

Figure 4:
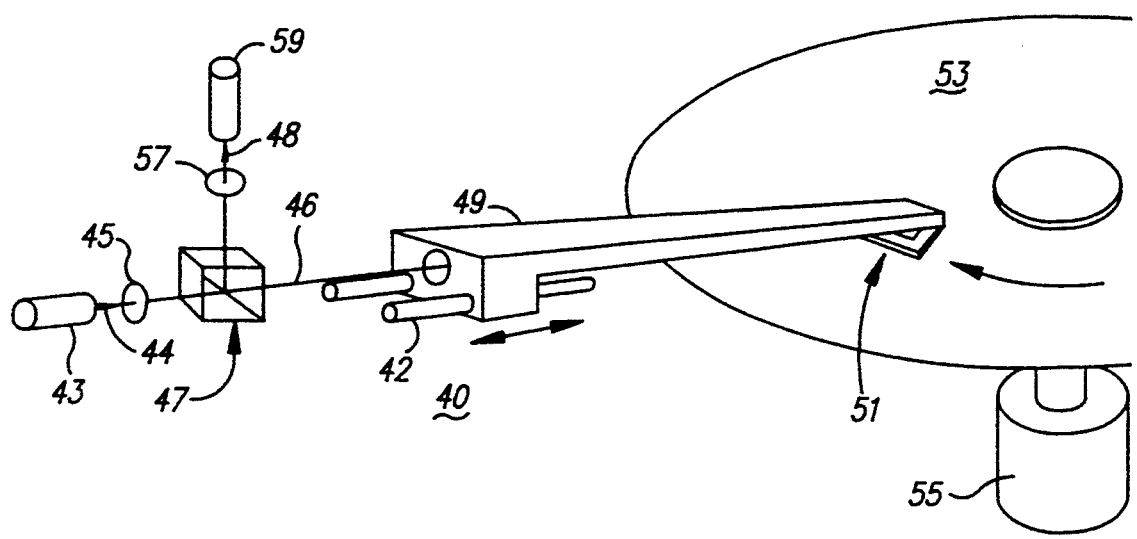
FIG. 4 is a conceptual diagram in perspective of an optical storage system in accordance with the present invention.

Referring to FIG. 4, an example of an information storage system implementing a tribo-attractive contact optical slider in a magneto-optical (MO) recording system is shown. The MO system 40 basically comprises a semiconductor laser 43, including collimating optics, generating a collimated laser beam 44, beam polarizing means 45, a beam splitter 47, a rigid suspension arm 49 supporting an optical slider 51 in physical contact with the surface of a rotatable optical disk 53, and motor means 55 coupled to the optical disk 53. The reflected or return beam 48 is separated out at the beam splitter 47 and directed to a detector circuit 59 via beam analyzer means 57. The optical disk 53 has a conventional structure, as described above with reference to FIG. 3, comprising a transparent substrate layer with a thin film optical medium layer on the inner or lower surface with a reflective overcoat layer. The outside or upper surface of the transparent substrate layer is coated with a conducting hard protective overcoat layer which is grounded to bleed off the tribo-electric charge generated by the relative motion between the slider and the disk surfaces. The hard amorphous carbon film commonly used with commercially available thin film magnetic storage disks is sufficiently conducting and transparent at thicknesses of 30 nm or less for this purpose.

Figure 5:
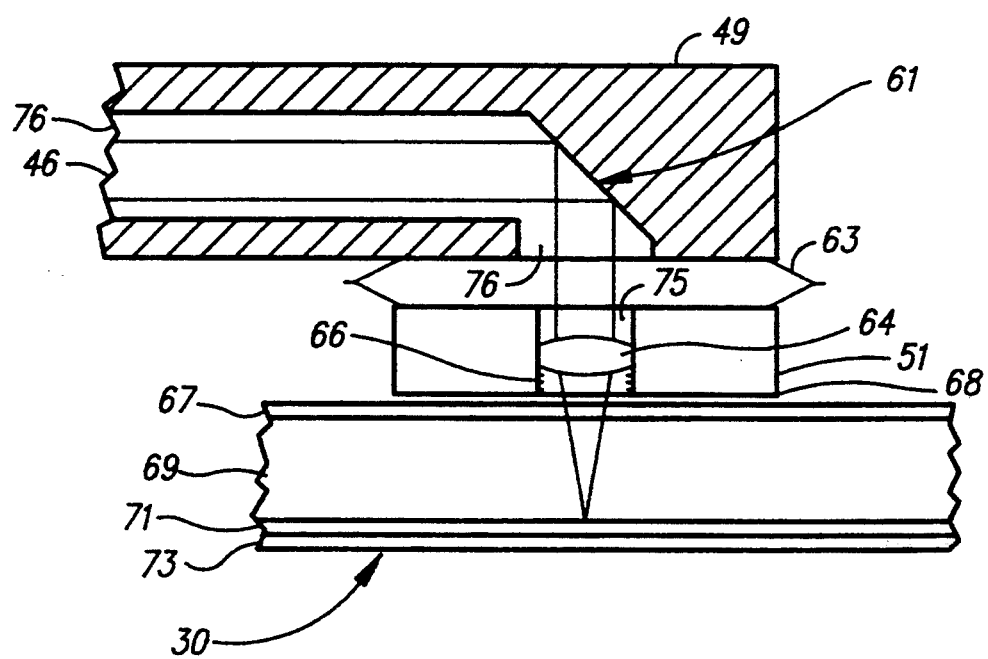
FIG. 5 is a cross-sectional view of a preferred embodiment of a slider for use in a magneto-optical storage system as shown in FIG. 4.
Figure 7:
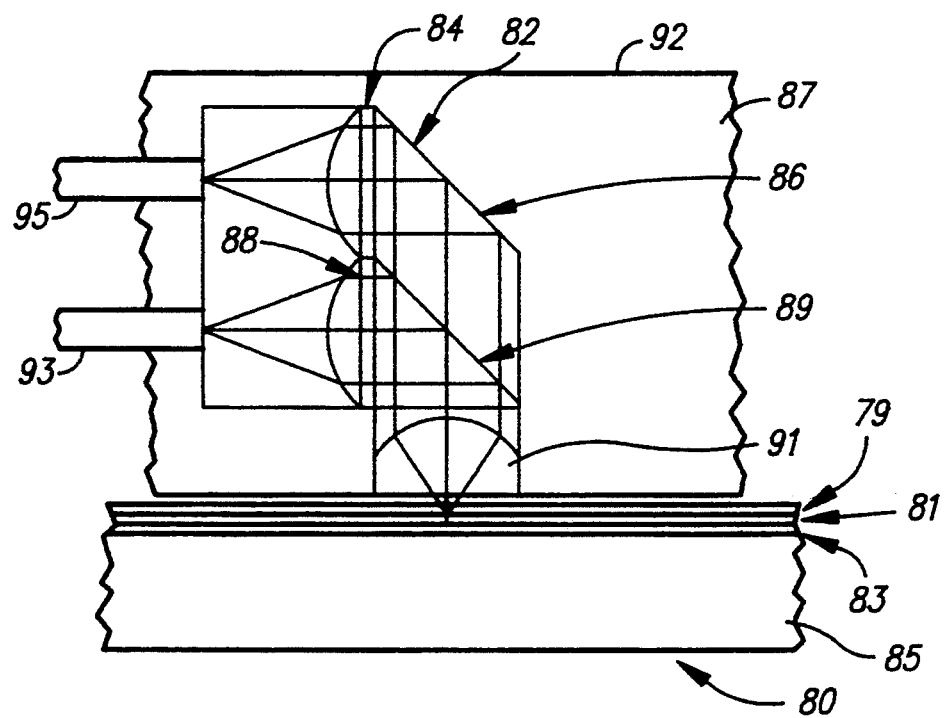
FIG. 7 is a cross-sectional view of another preferred embodiment of the slider shown in FIG. 4.

The optical slider 51 is suspended from the support arm 49 by spring flexures (as shown in FIGS. 5 and 7) such that the slider follows the disk surface vertically with surface roughness and disk run out. The rigid support arm 49 is mounted on rails 42 and is movable along the radius of the disk 53 such that the slider can access desirable disk tracks. The movement of the support arm 49 is coupled to an access mechanism (not shown) such as a voice coil motor, for example. The voice coil motor is a coil movable within a fixed magnetic field with the direction and velocity of the coil movement being controlled by optical head positioning circuitry (not shown). The optical slider 51 (as shown in FIG. 1) is shaped and mounted with respect to the disk motion to provide a "snow plow" affect; i.e., the optical slider effectively pushes aside any dust particles on the disk surface, thus minimizing or eliminating the possibility of dust or other particles getting in between the objective lens and the disk surface.

Referring now to FIG. 5, an optical slider 51 suitable for use in a magneto-optic (MO) storage system comprises a slider 51 having the objective lens 64 and the magnetic coil 66 mounted concentrically with the objective lens at or near the trailing edge of slider 54 in close proximity to the interface 68 between the slider 51 and the disk 30 surface. Alternatively, the objective lens 64 and magnetic coil 66 may be mounted internally in an aperture 75 extending vertically through the slider 51 or in a vertical channel 75 formed in the face of the trailing edge of slider 51. The slider 51 is suspended from support arm 49 by a flexure spring suspension 63. The slider 51 is positioned relative to support arm 49 such that the lens 54 is aligned with aperture 76 formed lengthwise in support arm 49. Laser beam 46 is directed along aperture 76 via mirror 61 and lens 64 to be focused on the magneto-optic media layer 71. Laser beam 46 comprises both the transmitted beam 44 and the return beam 48 reflected from reflection layer 73. As described above, magneto-optic disk 30 comprises a transparent substrate layer 69 having the magneto-optic media layer 71 with a reflective layer 73 on the inner or lower surface and a protective overcoat layer 67 in physical contact with the slider 51.

Figure 6:
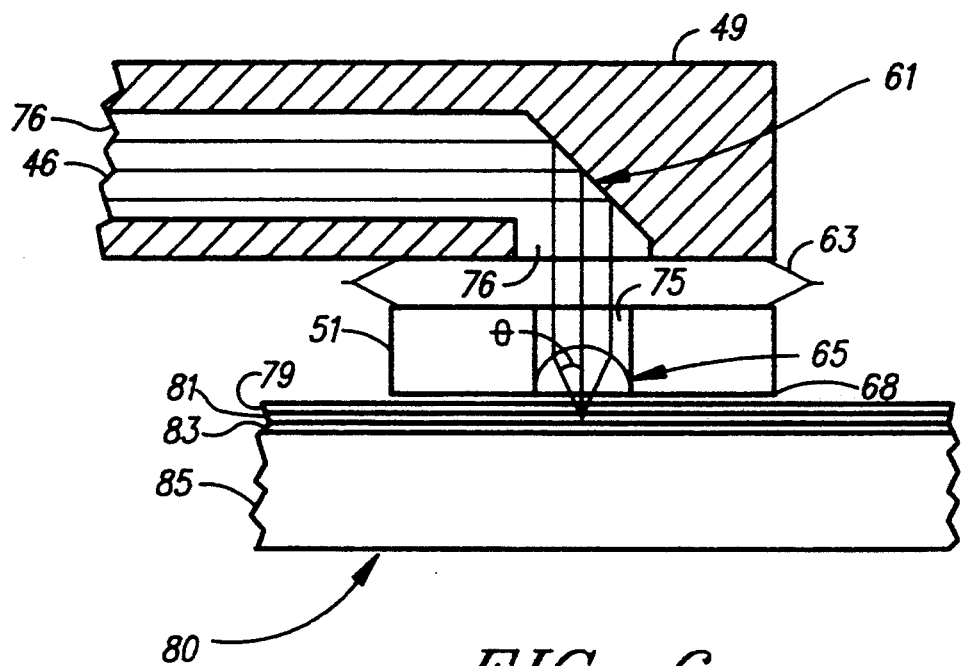
FIG. 6 is a cross-sectional view of a preferred embodiment of the slider shown in FIG. 4.

Referring now to FIG. 6, a contact slider 51 having a plano-convex objective lens 65 mounted thereon is suspended from the support arm 49 by flexure 63. As described above with respect to FIG. 5 objective lens 65 is positioned to receive laser beam 46 and focus it on the optical media layer 81. Utilizing the principle that the wavelength of light in a medium is reduced by its index of refraction in that medium, the optical resolution capability for a laser beam may be significantly increased over the resolution that can be achieved in air. This requires that materials having large refractive index be used for the objective lens 65 as well as for the protective overcoat layer 79. The flat bottom surface of the plano-convex objective lens 65 is co-planar with the bottom surface of the slider 51 in order to provide efficient transfer of light energy across the slider/disk interface 68 and to minimize any distortion in the focus. The optical disk 80 is similar to a conventional magnetic recording disk and comprises a substrate layer 85, typically of an aluminum alloy or glass having a very smooth upper surface, a reflective thin film layer 83 and an optic or magneto-optic media layer 81. The optic media layer 81 is overcoated with a transparent protective layer 79 which forms the disk surface in contact with the slider and is sufficiently thick, approximately 300Å or less, to provide chemical insulation and wear protection for the optical media layer. The reflective thin film layer 83 or the disk substrate layer 85 is grounded to provide for bleeding off of the tribo-electric charge generated by the relative motion between the disk and the slider 51. As stated above, the protective overcoat layer 79 is of a high refractive index material. Zirconia (ZiO₂) which has a refractive index of about two is a suitable disk coating for tribo-electric contact recording and is commonly used as a protective overcoat layer for magnetic thin film disks. Other examples of suitable hard materials having high refractive index are rutile (2.5), diamond (2.4), GaAs (3.3), SrTiO₃ (2.3) and Fe₂O₃ (3.2).

If the reflective index n of the objective lens 65 is assumed to be equal to the refractive index of the protective overcoat layer 79, then the resolution r for the system can be shown to be $$r = \frac{\lambda}{2n \sin\Theta}$$

where Θ is the angle of the focused optical cone as indicated in FIG. 6.

Referring now to FIG. 7, a composite optical slider is shown comprising an integrated optical head 82 mounted on or embedded in a contact slider 92. Optical fiber 95 couples the transmission beam to the slider 92 for further coupling via polarizing means 84 and mirror 86 to the objective lens 91 for focusing at the media layer 83. The reflected beam is coupled via the objective lens 91, beam splitter 89, beam analyzer means 88 and optical fiber 93 to the detector circuitry (not shown). Utilizing optical fibers 93, 95 with integrated optical elements including the polarizing means 84, mirror 86, beam splitter 89 and beam analyzer 88 reduces the complexity of the optical apparatus and allows precise optical alignment with the objective lens to be achieved. As described above with respect to FIG. 6, a suitable optical disk comprises disk substrate 85 having a reflective layer 83, the optical recording media layer 81 and protective overcoat layer 79 deposited thereon.

While the invention has been particularly shown and described with reference to various preferred embodiments thereof, it is understood by those skilled in the art that the invention is not to be limited to the disclosed embodiments, but that various modifications in the form and details may be made therein without departing from the spirit and scope of the appended claims.

We claim:

1. An optical head apparatus for use with an optical storage medium having a surface layer of a selected material, comprising:
   focusing means for focusing a light beam onto said optical storage medium; and
   support means maintained in sliding physical contact with said optical storage medium, said support means being fabricated of a material, wherein said surface layer of the optical storage medium and said material of the support means have a characteristic that a tribo-attractive force is generated between the support means and the optical storage medium as a result of sliding contact therebetween, said focusing means rigidly mounted on said support means in close proximity to a major surface of said optical storage medium.

2. An optical head apparatus as in claim 1 wherein said support means comprises a shaped contact slider fabricated of a material exhibiting a non-linear load versus friction characteristic in the negative load region.

3. An optical head apparatus as in claim 2 wherein said slider is of a material selected from the group consisting of single crystal diamond, single crystal sapphire, single crystal silicon, single crystal quartz, single crystal cubic boron nitride (cBN), single crystal calcium titanium oxide (CaTiO$_3$), silicon carbide (SiC) (hot pressed compaction), zirconium oxide (ZrO) (hot pressed compaction), aluminum oxide (Al$_2$O$_3$) (hot pressed compaction), polycrystal cubic boron nitride (cBN) and fused quartz.

4. An optical head apparatus as in claim 1 wherein said focusing means comprises an objective lens fixedly mounted on said support means.

5. An optical head apparatus as in claim 4 wherein said objective lens comprises a plano-complex lens having its flat side parallel to and closely adjacent said major surface of said storage medium.

6. An optical head apparatus as in claim 5 wherein said support means has a flat side, said flat side parallel to and in contact with said storage medium major surface, said flat side of said plano-convex lens being substantially co-planar with said support means flat side.

7. An optical head apparatus as in claim 4 wherein said objective lens is fabricated of a material having a refractive index substantially equal to that of said selected material of said surface layer.

8. An optical head apparatus as in claim 1 further comprising magnetic means for generating a magnetic field, said magnetic means rigidly mounted on said support means.

9. An optical head apparatus as in claim 8 wherein said magnetic means comprises a magnetic coil mounted on said support means concentrically with said focusing means.

10. An optical head apparatus as in claim 1 further comprising optical means for receiving said light beam and directing said light beam to and from said focusing means, said optical means rigidly mounted on said support means.

11. An optical head apparatus as in claim 10 wherein said optical means comprises mirror means for redirecting a received light beam.

12. An optical head apparatus as in claim 10 wherein said optical means comprises:
   mirror means for redirecting a transmitted light beam to said focusing means; and
   beam splitter means for redirecting a return light beam received from said focusing means.

13. An optical head apparatus as in claim 12 wherein said optical means further includes polarizing means for polarizing said transmitted light beam in a desired orientation and beam analyzer means for receiving and analyzing said return beam.

14. An optical head apparatus as in claim 13 wherein said optical means comprises an optical unit including selected integrated optical elements.

15. An optical head apparatus as in claim 10 further comprising optical fiber means for coupling said light beam to or from said optical means.

16. An optical disk storage system comprising:
   an optical storage medium comprising a rigid substrate having a layer of optical storage material and a surface layer of selected material thereon;
   an optical head and support means for supporting said optical head in substantially sliding physical contact with said optical storage medium, said optical head comprising a substrate of a material, wherein said surface layer of the optical storage medium and said material of the support means have a characteristic that a tribo-attractive force between the optical storage medium and the support means is generated as a result of sliding contact therebetween; and
   means coupled to said optical storage medium for producing relative motion between said optical storage medium and said optical head up to a selected operating speed sufficient to generate said tribo-attractive force, said tribo-attractive force having a magnitude sufficient for maintaining said optical head in substantially sliding physical contact with said optical storage medium at said selected operating speed, whereby data can be written or sensed without excessive wear to either said optical head or said optical storage medium.

17. An optical disk storage system as in claim 16 wherein said optical storage medium comprises a magneto-optic storage medium.

18. An optical disk storage system as in claim 17 wherein said optical head further comprises magnetic means for generating a magnetic field for biasing said magneto-optic storage medium.

19. An optical disk storage system as in claim 18 wherein said optical head includes an objective lens for transmitting a light beam to and from said optical storage medium, said magnetic means comprising a magnetic coil mounted on said substrate concentrically with said objective lens.

20. An optical disk storage system as in claim 16 wherein said support means comprises a rigid access arm and spring means for suspending said optical head, said spring means providing a predetermined external load on said optical head.

21. An optical disk storage system as in claim 20 wherein said spring means includes means for providing a zero or negative external load when said optical head is in sliding physical contact with said optical storage medium moving relative to said optical head at said selected operating speed.

22. An optical disk storage system as in claim 20 wherein said rigid access arm comprises a linear access arm for linear movement along a radius of said optical storage medium.

23. An optical disk storage system as in claim 16 wherein said optical head further comprises an objective lens fixedly mounted on said substrate.

24. An optical disk storage system as in claim 23 wherein said substrate comprises a shaped slider, a lower surface of said slider being in substantial physical contact with said optical storage medium.

25. An optical disk storage system as in claim 24 wherein said objective lens comprises a plano-convex lens fabricated of a material having a refractive index substantially equal to that of said selected material of said surface layer, the flat side of said plano-convex lens being substantially co-planar with said flat side of said slider.

26. An optical disk storage system as in claim 23 wherein said optical head further comprises an optical unit including integrated optical elements for redirecting a light beam to and from said objective lens.

27. An optical disk storage system as in claim 26 wherein said integrated optical elements include:
mirror means for redirecting a transmitted light beam to said objective leans; and
beam splitter means for redirecting a return light beam received from said objective lens.

28. An optical disk storage system as in claim 26 further comprising fiber optic means for coupling said light beam to and from said optical unit.

29. An optical disk storage system as in claim 16 wherein said substrate comprises a shaped contact slider fabricated of a material exhibiting a non-linear load versus friction characteristic in the negative load region.

30. An optical disk storage system as in claim 29 wherein said slider is of a material selected from the group consisting of single crystal diamond, single crystal sapphire, single crystal silicon, single crystal quartz, single crystal cubic boron nitride (cBN), single crystal calcium titanium oxide ($CaTiO_3$), silicon carbide (SiC) (hot pressed compaction), zirconium oxide (ZrO) (hot pressed compaction), aluminum oxide ($Al_2O_3$) (hot pressed compaction), polycrystal cubic boron nitride (cBN) and fused quartz.

* * * * *

UNITED STATES PATENT AND TRADEMARK OFFICE
CERTIFICATE OF CORRECTION

PATENT NO. :   5,351,229
DATED      :   Sept. 27, 1994
INVENTOR(S) :  B. Brezoczky et al.

It is certified that error appears in the above-indentified patent and that said Letters Patent is hereby corrected as shown below:

```
Column 1, line 29, delete "tile", insert -- the --.
Column 1, line 31, delete "tile", insert -- the --.
Column 3, line 34, delete "tile", insert -- the --.
Column 3, line 38, delete "tile", insert -- the --.
Column 3, line 39, delete "tile", insert -- the --.
Column 3, line 40, delete "tile", insert -- the --.
Column 3, line 46, delete "tile", insert -- the --.
Column 3, line 52, delete "tile", insert -- the --.
Column 4, line 63, delete "tile", insert -- the --.
Column 4, line 68, delete "tile", insert -- the --.
Column 5, line  2, delete "tile", insert -- the --.
```

Signed and Sealed this

Twenty-eight Day of March, 1995

Attest:

BRUCE LEHMAN

*Attesting Officer*     *Commissioner of Patents and Trademarks*